Figure 1:
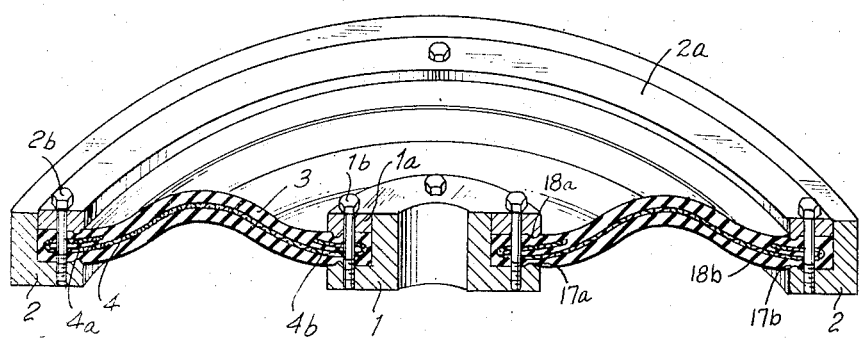

INVENTOR.
BERNHARD HACKFORTH
BY Ross & Mestern 3,368,835
FLEXIBLE COUPLINGS
Bernhard Hackforth, Heerstrasse 52/58,
Wanne-Eickel, Germany
Original application Aug. 9, 1961, Ser. No. 130,410.
Divided and this application July 14, 1965, Ser. No. 471,973
Claims priority, application Germany, Aug. 11, 1960, H 40,186
4 Claims. (Cl. 287—85)

The present application is a division of my copending application Ser. No. 130,410 filed Aug. 9, 1961 (now U.S. Patent No. 3,207,539).

Flexible couplings for shafts and the like are known wherein the rigid parts of the couplings are situated one inside the other in a substantially coaxially or radially spaced relationship and are connected by an annular coupling element of elastically deformable material, which is fastened on the rigid parts of the coupling along its outer and inner peripheries. These coupling elements of annular shape (which shape may be extended to form a complete disc, here regarded as annular) may be curved on one side and may also be thickened towards the inner edge so that the surfaces taking the forces acting on the inner and outer edges of the coupling element are equal to one another as far as possible. The coupling element may be fastened on the rigid parts of the coupling by vulcanization, by clamping edge zones of the coupling element with the aid of rigid clamping rings, or by means of a number of pins, e.g. bolts, which hold the coupling element at spaced locations only.

A reinforcing inlay, consisting for example of woven textile, woven plastic or woven wire, may be embedded in the coupling element, but the life of the latter is still unduly limited, this life being the shorter the higher the forces that are to be transmitted and the more nonuniform the action of these forces upon the element and its reinforcement. Experience has shown that partial damage of a coupling element occurs first of all at the connections to the rigid coupling parts or in the immediate vicinity of these connections. This is particularly the case if the coupling element is held on the rigid coupling parts only or substantially only by pins, because in that case the parts of the coupling element situated between the fastening points can yield under the tensile stresses occurring during operation and consequently do not participate as actively in the power transmission as those parts situated in the immediate region of the connections. This yielding process may occur even with clamped connections if the edges of the coupling element are not clamped sufficiently firmly over their entire periphery. It is obvious that a conventional reinforcing inlay, which must naturally participate in the elastic deformations of the coupling element during operation, is not able to prevent this yielding of the edge zones or even appreciably to attenuate it. Furthermore, my research has shown that very early local damage occurs to the resilient coupling elements if the reinforcing inlay does not extend to the immediate vicinity of the edges of the coupling elements and consequently is not engaged sufficiently by the clamp parts or if the pins passing through the coupling elements do not pass through the inlay at all or else pass through it at a region too close to the edge. The inlay frequently terminates at a fairly considerable distance from the edges of the coupling element at a relativly large number of places by means of the fact that, during the molding of the raw material for the elastically deformable coupling element, the inlay embedded therein moves out of position and this movement is not observed and cannot be prevented during the molding operation.

According to the present invention, the reinforcing inlay is folded over near the outer and inner edges of the coupling element so as to double the edge zones of the inlay. Such a folding over of the inlay, effected prior to a molding operation employed to make the coupling element, gives the inlay a more stable shape than hitherto, and the thickening formed as a result of the doubling prevents the inlay from being pulled away from the edge of the coupling element during its embedding in the elastically deformable material.

Preferably the doubled-edge marginal zones of the sheet line reinforcing inlay each enclose a reinforcing ring (e.g. of wire or stranded wire) disposed inside the coupling element at a slight distance from the respective edge thereof. These rings are even more effective than the double-edge zones of the inlay in preventing any yielding of parts of the coupling element situated outside the fastening points, and transmit the forces acting upon the fastening points to the parts situated beyond the fastening points. All the parts of the coupling element are therefore subjected to more uniform stresses and to corespondingly smaller stresses at the points of action of the force.

If, during the assembly of the coupling, care is taken to ensure that the clamping parts engage over these rings enclosed by the reinforcing inlay or that fastening pins pass through the inlay near the ring, the result is a coupling in which the life of the resilient ring depends practically only on the aging of the elastically deformable material. At the same time, couplings may be made which are suitable for the transmission of nonuniform forces and also of much greater forces than known couplings of similar dimensions.

The increase in the shape stability of the reinforcing inlay by folding over the edge zones also enables a number of such inlays, for example two, to be disposed inside the elastically deformable material. These two reinforcing inlays may each enclose a reinforcing ring both at the inner periphery at the outer periphery, or alternatively at least the edge zones of the two reinforcing inlays adjacent one edge (either inner or outer) of the coupling element may be folded over in opposite directions around a common ring disposed near the edge concerned. In this case, the wall thickness of the coupling element may be made smaller than when use is made of two spaced-apart reinforcing inlays disposed one above the other in the axial direction. In the case of coupling elments which are thickened towards one edge, two inlays may be folded over a common ring at the thinner edge and around a respective one of two axially spaced rings at the thicker edge.

Figure 2:
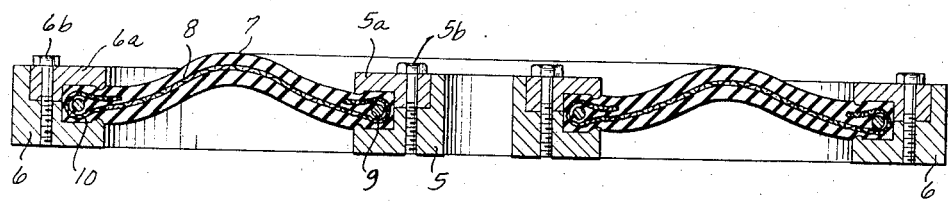
Figure 3:
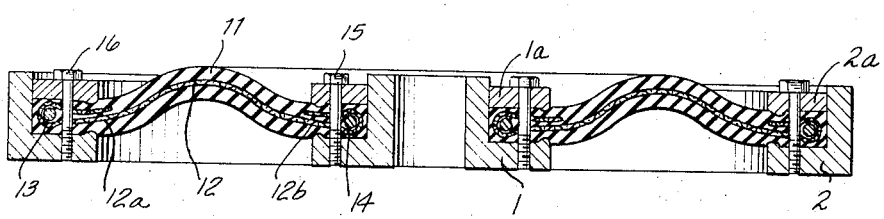

Different flexible couplings according to the invention are shown in the accompanying drawing, FIGS. 1 to 3 being respective axial sections of three couplings.

In the embodiment shown in FIG. 1, the inner rigid coupling ring 1 and the outer rigid coupling ring 2 are connected together by an annular disk-shaped element 3 of elastically deformable material, for example rubber. This element is connected at its inner edge by a clamping ring 1a and bolts 1b to the coupling part 1 and at its outer edge by a clamping ring 2a and bolts 2b to the outer coupling ring 2. The reinforcing inlay 4, wholly embedded in the resilient material, is folded over at its outer and inner edges so as to form doubled-edge zones 4a and 4b through which the bolts 1b and 2b pass.

In the embodiment of FIG. 2, the inner rigid coupling part 5 and the outer rigid coupling part 6 are connected by an annular resilient coupling element 7. Here, the connection is established by clamping rings 5a and 6a which, however, are clamped to the coupling parts 5 and 6 by means of bolts 5b and 6b disposed outside the coupling element 7. The inner and outer edges of the reinforcing inlay are each folded over a ring 9 and 10 respectively arranged near the edges of the coupling element 7. The edge strips of the inlay 8 folded over these rings 9 and 10 extend into the interior of the coupling element 7 to an extent such that the pressure from the clamping rings 6a and 5a still acts upon them in such manner that the reinforcing inlays transmit the power not only by rubber adhesion but also by contact pressure.

In the flexible coupling according to FIG. 3, reinforcing rings 13 and 14 are situated inside the double-edge zones 12a and 12b. The bolts 15, 16 pass through the doubled zones 12a, 12b immediately adjacent the rings 13, 14.

In the embodiments of FIGS. 1 and 3, to which the appended claims relate, the inner and outer peripheries of the disk-shaped connecting element 3 or 11 are respectively engaged by inner coupling member 1 and associated clamping ring 1a and by outer coupling member 2 and associated clamping ring 2a, these coupling members and associated annular clamps exerting pressure upon the element 3 throughout respective edge zones which extend from the outer or inner periphery of the element 3 or 11 toward the free edge of the corresponding reinforcement layer 4a, 4b or 12a, 12b formed by the inwardly turned marginal portions of inlay 4 or 12; the expression "inwardly turned" is here intended to signify a direction away from the corresponding periphery. The securing members 1b, 2b or 15, 16, interconnecting the two members of each clamping means 1, 1a or 2, 2a, pass through the double-thickness area of inlay 4 or 12 by traversing this inlay at points located between the fold line and the free edge of the inwardly turned sheet portions 4a, 4b or 12a, 12b; in the embodiment of FIG. 3, rings 13 and 14 are located next to the respective fold lines so that bolts 16 and 15 pass inwardly of these rings as defined above.

Attention is further called to the fact that the coupling members 1, 2 and the associated annular clamps 1a, 2a are formed with axially aligned annular projections 17a, 17b and 18a, 18b which confrontingly engage the connecting element 3 or 11 at a location between the free edge of the turned-over inlay portion (4a, 4b or 12a, 12b) and the associated securing members, i.e. the bolts 1b, 2b or 15, 16.

I claim:

1. A flexible coupling for shafts and the like, comprising two radially spaced rigid coupling members; an annular flexible disk-shaped connecting element bridging said coupling members and having inner and outer peripheries respectively secured to said coupling members, said connecting element comprising a body of elastically deformable material and an annular reinforcing inlay of woven sheet material wholly embedded in said body and extending to said peripheries therewithin, said inlay having radially outwardly and inwardly turned annular marginal portions of said sheet material all along said inner and outer peripheries respectively of said connecting element, said marginal portions forming peripheral reinforcement layers of limited radial extent connected with the main portion of said inlay along closed peripheral fold lines wholly embedded in said body so as to provide said inlay with inner and outer peripheral zones of substantially twice the thickness of said sheet material, each of said reinforcement layers being bounded by an annular free edge radially spaced from its fold line and also wholly embedded in said body; and respective clamping means for anchoring said connecting element to each of said coupling members, each of said clamping means including an annular clamp bearing upon said connecting element throughout a respective edge zone extending from the respective periphery of said connecting element toward the free edge of the corresponding reinforcement layer, each of said clamping means further including a plurality of circumferentially spaced securing members passing through the respective reinforcement layer between the fold line and the free edge thereof, said securing members engaging the respective clamp and the associated coupling member and urging same against each other through the intervening edge zone of said connecting element whereby the latter is subjected to clamping pressure, said clamp and associated coupling member each being provided with an axially projecting annular ridge, said ridges being in axial alignment with each other and confrontingly engaging said connecting element at a location between said free edge and said securing members.

2. A flexible coupling as defined in claim 1 wherein said inlay is a woven textile fabric.

3. A flexible coupling as defined in claim 1 wherein said inlay consists of woven synthetic-resin filaments.

4. A flexible coupling as defined in claim 1 wherein said inlay is a woven-wire fabric.

References Cited

UNITED STATES PATENTS

| 1,620,415 | 3/1927 | Van Orman | 285—200 |
| 2,741,496 | 4/1956 | Melsom | 285—149 |
| 1,604,925 | 10/1926 | Macdonald | 64—13 |
| 2,655,195 | 10/1953 | Curtis | 74—237 XR |
| 2,755,214 | 7/1956 | Lyons et al. | 161—46 XR |
| 2,792,868 | 5/1957 | Benson | 74—232 XR |

FOREIGN PATENTS

| 574,468 | 1/1946 | Great Britain. |
| 842,878 | 7/1952 | Germany. |
| 282,817 | 8/1952 | Switzerland. |
| 225,647 | 11/1959 | Australia. |

CARL W. TOMLIN, *Primary Examiner.*

A. KUNDRAT, *Assistant Examiner.*